ERWIN M. ROSCHKE
*INVENTOR.*
BY Francis W. Crotty
HIS ATTORNEY.

ERWIN M.ROSCHKE
*INVENTOR.*

BY Francis W. Crotty
HIS ATTORNEY.

ERWIN M. ROSCHKE
*INVENTOR.*

BY Francis W. Crotty

HIS ATTORNEY.

United States Patent Office 2,982,952

Patented May 2, 1961

2,982,952

SUBSCRIPTION TELEVISION

Erwin M. Roschke, Des Plaines, Ill., assignor to Zenith Radio Corporation, a corporation of Delaware Filed June 28, 1955, Ser. No. 518,562

12 Claims. (Cl. 340—345)

This invention concerns subscription television systems wherein a television signal is transmitted in coded form to be utilized only in subscriber receivers having decoding devices which are controlled in accordance with the same code schedule as that employed at the transmitter.

A number of subscription television systems have already been proposed in which a key or coding signal, containing information which identifies the code schedule in scrambled or camouflaged form, is transmitted as a modulation component of the coded television signal itself or over an auxiliary air channel. The air-borne key signal is unscrambled or decoded at the receivers in a manner known only to authorized subscribers and the unscrambled key signal is used to actuate suitable decoding apparatus to decode the received coded television signal. Scrambling and unscrambling of the key signal may be achieved in a variety of ways, for example, by means of a plurality of code-determining elements, such as switches, used to alter some characteristic of the signal or to channel different portions of the signal to different input circuits of encoding apparatus. Systems of this general type are disclosed and claimed in copending applications Serial No. 281,418, filed April 9, 1952, and issued July 15, 1958 as Patent 2,843,656, in the name of George V. Morris et al.; Serial No. 326,107, filed December 15, 1952, and issued February 11, 1958 as Patent 2,823,252, in the name of Jack E. Bridges; and Serial No. 370,174, now Patent Number 2,910,526, filed July 24, 1953, and issued October 27, 1959 as Patent 2,910,526, in the name of Walter S. Druz, all of which are assigned to the present assignee.

While the coding techniques of such prior systems employing air-borne code-conveying signals are effective and provide a relatively high degree of secrecy, it may be desirable in certain installations to send no coding information over the air whatsoever. Of course, when no code-conveying signal is transmitted, the security of the system is adequate if the code schedule is sufficiently complex and, if repetitive, of a long period. To that end, the present invention provides an improved subscription television system which does not require the transmission of coding information between the transmitter and various receivers.

It is, therefore, one object of the invention to provide a new and improved subscription television system wherein complex mode changing is effected without a constant transmission of coding information from the transmitter to each receiver.

It is also an object of the invention to provide a new and improved subscription televsion system in which a television signal is coded with a high degree of complexity.

Many prior subscription television systems require the subscriber to adjust or set up his decoding mechanism before each program interval in order to effect proper decoding. Since this function is performed by the public, the adjustment to be made must be simple and it would be highly desirable to arrange the system so as to impose no such duty on the subscriber in setting up his decoding equipment if that can be accomplished economically while, at the same time, preserving security against pirating. The present invention provides such an improved system featuring a code storage device, having a series of storing areas, which is used in a particularly novel manner to realize coding and decoding. The storage device may take the form of a card having printed-circuit resistive elements disposed therein, each resistive element representing a different storing area. The code card is used in conjunction with a reading device, such as a beam-deflection tube, to produce a control effect determined by the resistivity of the code storing areas and, preferably, varying in time as the storage device is read or scanned. The varying control effect obtained from scanning is utilized to achieve encoding in the system. The printed-circuit code cards may be constructed very economically, and a uniquely different distribution of different resistive elements thereon may be used to individualize the code schedule for each subscription program. The only effort required of the subscriber is that he insert an appropriate storage card into his decoder before each program.

It is, therefore, another object of the invention to provide a simple and convenient code storage device for prescribing coding and decoding information in a subscription television system.

It is still another object to provide an easily merchandisable element which may be applied at the subscription transmitter and receivers to control the coding and decoding operations.

An encoding arrangement for a subscription television system, constructed in accordance with the present invention, comprises a code storage device having a series of code storing areas individually exhibiting, as to a property which is common to all such areas, a particular value within a given range of values and determined in accordance with the stored information of each individual area. A reading device is provided for reading the code storing areas to derive a control effect having a variable characteristic instantaneously determined by the value of the property exhibited by such of the code storing areas as are instantaneously read by such reading device. An encoding apparatus, which has a series of encoding conditions, responds to variations in the characteristic of the control effect for changing from one to another of its conditions. Finally, the encoding arrangement includes means for utilizing the control effect derived by the reading device to actuate the encoding apparatus.

The features of this invention which are believed to be new are set forth with particularity in the appended claims. The invention, together with further objects and advantages thereof, may best be understood, however, by reference to the following description when taken in conjunction with the accompanying drawings, in which:

*Transmitter construction*

Figure 1:
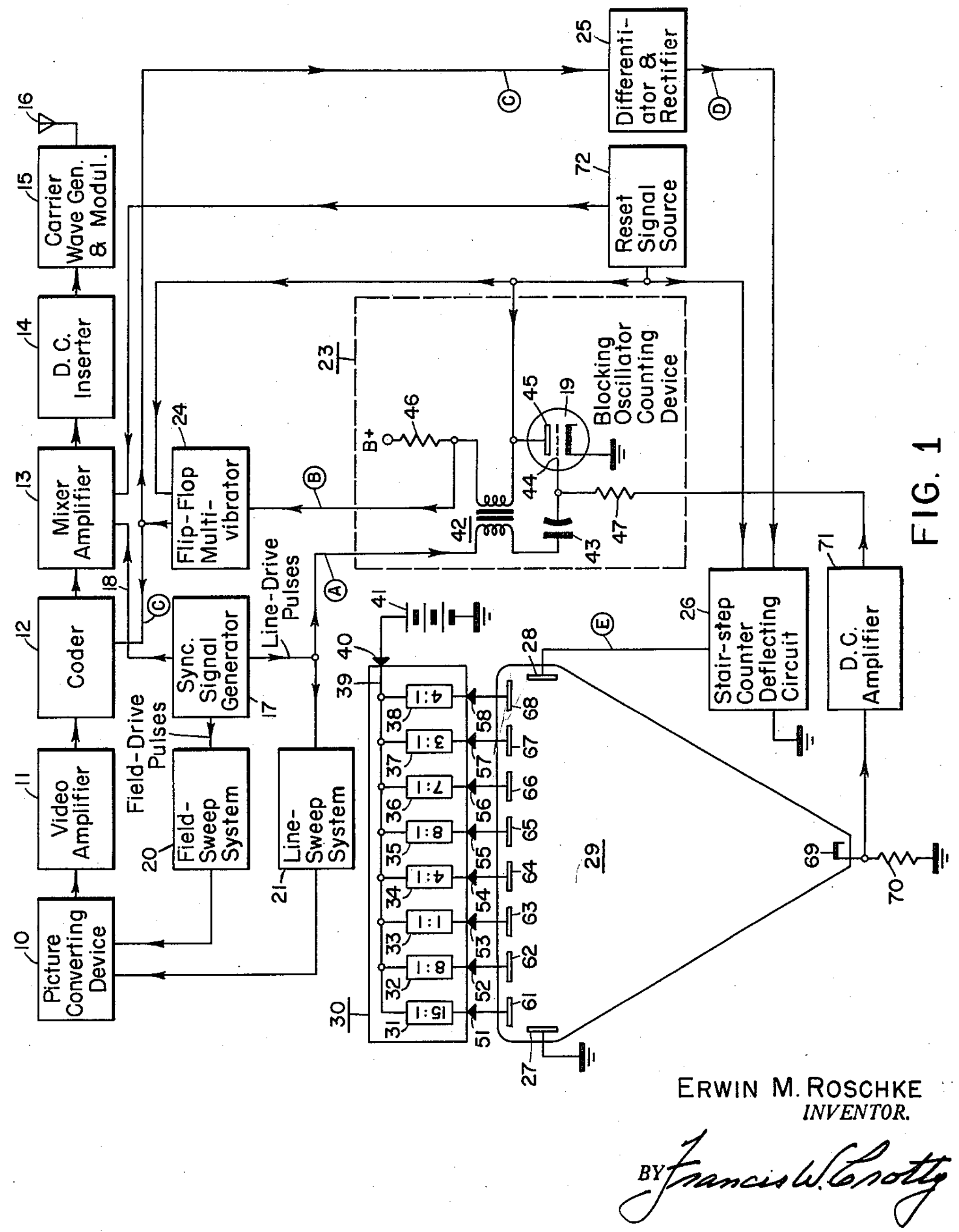
Figure 1 is a schematic representation of a subscription television transmitter including an encoding arrangement constructed in accordance with the invention.

The transmitter of Figure 1 includes a picture-converting device 10 which may take conventional form for developing a video signal representing an image to be televised. The output circuit of picture converter 10 is connected through a video amplifier 11 and a coding device 12 to the input terminals of a mixer amplifier 13. Coder 12 may be similar to that disclosed and claimed in copending application Serial No. 243,039, filed August 22, 1951, and issued August 7, 1956 as Patent 2,758,153, in the name of Robert Adler and assigned to the present assignee. Briefly, coder 12 may comprise a beam-deflection tube having a pair of output circuits which may be selectively introduced into the video channel as the electron beam of the tube is deflected from one to another of two target anodes coupled to such output circuits. One of these circuits includes a time-delay network so that the timing of the video components relative to the synchronizing components of the radiated television signal varies as the beam of the deflection tube is switched between its anodes. This switching effect is accomplished by a deflection-control or actuating signal applied to coder 12, as explained hereinafter. Such intermittent variations in the relative timing of the video and synchronizing components effectively codes the television signal since conventional television receivers, not equipped with suitable decoding apparatus, require a constant or invariable time relationship between the video and synchronizing components to provide intelligible image reproduction.

In view of the fact that coder 12 is switched between two target anodes it effectively has two stable operating conditions, each of which imposes a different operating mode on the transmitter. In the first operating condition, coder 12 extends the video channel from amplifier 11 to mixer 13 without introducing any appreciable time delay, and in this condition the transmitter operation is conventional particularly in respect of the time relation between the video and synchronizing components of the radiated signal. In its second operating condition, the encoding device introduces a time delay in the video channel, and the transmitter then functions in an unconventional mode sice the video and synchronizing components of the radiated signal have an abnormal time relation with respect to one another.

Mixer 13 is coupled through a direct-current inserter 14 to a carrier-wave generator and modulator 15 which, in turn, is connected to an antenna 16. The transmitter also includes a synchronizing-signal generator 17 which supplies field- and line-synchronizing components and associated pedestal components to mixer amplifier 13 through suitable circuit connections here schematically represented as a single conductor 18. Generator 17 further supplies field- and line-drive pulses to a field-sweep system 20 and to a line-sweep system 21, respectively. The output terminals of sweep systems 20 and 21 are connected to the field- and line-deflection elements (not shown) associated with picture-converting device 10.

Synchronizing-signal generator 17 additionally supplies line-drive pulses to one input circuit of a conventional blocking oscillator serving as a counting device 23; specifically, the pulses are applied to the control grid 44 of a triode 19 employed in the oscillatory circuit through the secondary winding of a transformer 42 and a condenser 43. This blocking oscillator does not operate at a fixed frequency and consequently does not exhibit a fixed counting ratio. Instead it is adjustable as to frequency to effect any one of several counting ratios determined during any operating interval by the potential level of a control signal supplied thereto, as explained hereinafter. The counting rate or oscillation frequency of counter 23 may be varied in response to a control signal by utilizing that signal to change the operating bias on vacuum tube 19 since, as is well understood in the art, the interval in which the tube remains blocked and, therefore, the operating frequency vary with changes in bias. Expressed differently, the circuit recovers, after the tube has blocked, asymptotically with respect to its firing point but that point varies with bias.

Anode 45 of tube 19 is connected through the primary winding of transformer 42 and a resistor 46 to a source of positive unidirectional potential B+. The junction between the primary winding and resistor 46 is connected to the input circuit of a conventional flip-flop or bistable multivibrator 24 which has its output terminals connected to coder 12. Multivibrator 24 operates in response to applied pulses from counting device 23 to effect actuation of coder 12 between its operating conditions to encode the television signal in accordance with a predetermined code schedule, determined by the occurrence of the pulses from the counting device.

The output terminals of multivibrator 24 are also connected through a differentiator and single polarity or half wave rectifier 25 to one input circuit of a stair-step counter deflecting circuit 26. This stair-step counter may be conventional in construction and operates in response to applied pulses from unit 25 to produce a signal having a stair-step shaped wave form with a predetermined number of steps—eight in the particular illustrated case for reasons which will be apparent. One output terminal of stair-step counter 26 is connected to a deflection element 28 of a beam-deflected tube 29, and the other output terminal is connected to ground. Another deflection electrode 27 is also connected to ground.

A code storage device 30, which may take the form of a card or panel, has a series of code storing areas 31–38, specifically resistive elements, printed thereon by conventional printed circuit techniques. The resistance presented by resistive elements 31–38 may be distinctly different, although two of the values repeat in the series illustrated. It will be seen later that as each element is read counter 23 operates at a ratio determined by the resistance thereof. The ratios indicated within the elements 31–38 in Figure 1 represent the counting ratios of counter 23 when each individual storing area 31–38 is being read.

One side of each element 31–38 is connected to a common conductor 39 which is adapted to engage electrically a fixed contact 40, when the code card is inserted into the subscription system. Contact 40, in turn, is connected to the positive terminal of a source of unidirectional potential 41, the negative terminal of which is connected to ground. The other terminal of each element 31–38 is adapted to engage electrically an assigned one of a series of fixed contacts 51–58, respectively, when card 30 is in its operative position in the subscription system. Fixed contacts or terminals 51–58 are connected, in turn, to a series of target anodes 61–68, respectively, of switch tube 29. Each one of the eight potential levels of the stair-step wave form developed in deflecting circuit 26 for application to deflecting electrode 28 of beam-deflection device 29 directs the electron beam thereof to an assigned one of the eight target anodes 61–68.

Beam-deflection tube 29 may be provided with a quantizing grid in well known manner which feeds a voltage back to the deflecting circuit to insure that the electron beam does not move or step to the next target anode until the stair-step counter is actuated to its next operating step.

The cathode 69 of tube 29 is connected through a resistor 70 to ground and is also connected to an input circuit of blocking oscillator 23, specifically to control grid 44, through a D.C. amplifier 71 and a resistor 47. This coupling circuit to counter 23 controls the bias of tube 19 and consequently the operating frequency or counting ratio as determined by the instantaneous voltage drop across cathode resistor 70, which is determined in turn by the instantaneously active one of resistive elements 31–38.

It is possible that noise or other extraneous signals may cause the decoding equipment at some subscriber receivers to fall out of step occasionally with the corresponding coding equipment at the transmitter. To remedy this condition, it is desirable to provide a reset circuit which is operated from time to time during a subscription telecast to translate a signal to the coding equipment at the transmitter and to control the application of a corresponding signal to the decoding equipment at the various authorized receivers for resetting or "locking-in" all of the equipment. Appropriate reset mechanisms are disclosed in complete detail in other copending applications, such as Serial No. 344,996, filed March 27, 1953, now abandoned, in the name of Carl G. Eilers et al., and assigned to the present assignee, and therefore is merely illustrated in the present case by a reset signal source 72 having one pair of output terminals connected to additional input circuits of multivibrator 24, blocking oscillator counting device 23, and stair-step counter 26, and another pair of output terminals connected to mixer 13. Source 72 supplies reset pulses to reset each one of the counting circuits to a predetermined reference operating condition, and also supplies reset bursts of a preselected frequency to mixer 13 wherein they are combined with the composite television signal for transmission to the subscriber receivers to produce corresponding reset pulses for resetting the decoding apparatus. Resetting may occur, for example, as in the aforementioned Eilers et al. application once every 60 field-trace intervals, at which time a pulse is developed at the transmitter and duplicated at the receiver for delivery to the counting circuits employed in that application. Such reset circuitry may very conveniently be employed as signal source 72. Of course, randomly resetting the counters increases the coding complexity—especially if stair-step counter 26 is reset at different steps and before it reaches the end of its cycle.

*Transmitter operation*

In order to simplify an explanation of the invention, the operation of the transmitter will be considered initially without regard to the technique of coding. Picture-converting device 10 develops a video signal representing the image to be televised and this signal, after amplification in video amplifier 11, is supplied through coder 12 to mixer amplifier 13. The mixer also receives the usual line- and field-synchronizing and blanking pulses over conductor 18 from synchronizing-signal generator 17. A composite video signal is developed by mixer 13, is adjusted as to proper background level in direct-current inserter 14, and is amplitude modulated on the picture carrier wave in unit 15. The modulated video carrier wave is supplied to antenna 16 for transmission to subscriber receivers. Sweep systems 20 and 21 which control the scanning functions of picture converter 10 are, of course, synchronized by the field- and line-drive pulses from generator 17. As in any television transmission, the accompanying audio information is modulated on a sound carrier and concurrently radiated; the sound system may be entirely conventional or may include suitable sound coding apparatus.

Coding of the video signal is accomplished by coder 12 under the influence of a control signal developed by multivibrator 24 which switches the beam of the beam-deflection tube comprising coder 12 back and forth between its two target anodes in accordance with a code schedule represented by the amplitude variations of the control signal. As mentioned hereinbefore, this actuation of coding device 12 varies the operating mode of the transmitter by modifying the time relation between the video and synchronizing components of the radiated signal and thus achieves effective picture scrambling or coding.

Consideration will now be given to the manner in which a deflection-control signal is developed for coder 12 in accordance with the present invention, with particular reference to the idealized signal wave forms of Figure 2 which appear at various portions of the transmitter indicated by encircled reference letters corresponding to the letter designations of the graphs. Periodically recurring line-drive pulses, shown in curve A, are supplied to counting device 23 wherein they are frequency divided on a basis determined by the instantaneous coding condition of the coding apparatus (namely, determined by the instantaneous counting ratio or oscillating frequency of counter 23) to produce the pulses of curve B for application to multivibrator 24 which, in response to each applied pulse, is actuated from its instantaneous operating condition to its other stable operating condition thereby to produce the signal of curve C. The manner in which the pulses of curve B appear at random as represented and consequently the random amplitude excursions of the wave form of curve C will be apparent presently.

The signal of curve C is applied to differentiator and rectifier 25 wherein it is differentiated and rectified to develop pulses (curve D) for application to stair-step counter 26 which occur in response to the positive amplitude changes only of the signal of curve C. Counter 26 responds in step-by-step fashion to the successive pulses of curve D and executes a complete cycle of operating steps after each series of eight such pulses.

Assume initially that stair-step counter 26 is in its first step wherein the potential or amplitude level of its output signal (curve E) has its lowermost value as indicated by the initial portion of wave form E. For this condition, the deflection potential between deflectors 27 and 28 is such as to direct the electron beam of tube 29 to target anode 61, causing electron flow through cathode resistor 70, the space discharge path of tube 29 to anode 61, contact 51, resistive element 31, conductor 39, and supply 41. The magnitude of current is, of course, dependent on the resistance presented by element 31, and consequently, the control potential applied from resistor 70 to counting device 23, after amplification in amplifier 71, is directly determined by element 31. For the case at hand it is assumed that the resistance value of element 31 establishes a counting ratio in device 23 of 15:1 with respect to the input pulses of curve A.

Counting device 23 therefore produces pulse 75 of curve B at the end of fifteen operating steps, although only ten such steps are represented to the left of the pulse in curve B since it is assumed that the oscillator is in its fifth step at the beginning of the curve. Pulse 75 therefore triggers multivibrator 24 and since the output signal of multivibrator 24 (curve C) undergoes a positive amplitude change at that time, rather than a negative change, a pulse 76 (curve D) occurring in time coincidence with pulse 75 is supplied to step counter 26. This pulse triggers counter 26 from its first to its second operating step and increases the deflection potential impressed on elements 27 and 28 to the next level in a positive direction as shown in curve E. The increased deflection potential steps the beam from target 61 to target 62 and thus element 32 becomes effective. The resistance of this element modifies the control potential applied from resistor 70 to counting device 23 to effect operation thereof at an 8:1 ratio, rather than 15:1 as was the case with element 31 in the circuit.

The blocking oscillator, therefore, fires in response to the next succeeding series of eight line-drive pulses of curve A to produce pulse 77 of curve B for application to multivibrator 24. This pulse triggers the multivibrator to its other condition wherein the output signal (curve C) executes a negative excursion. No pulse is supplied to counter 26 at this time but, in response to the next series of eight line-drive pulses, the blocking oscillator produces pulse 78 which causes the output signal of multivibrator 24 to undergo a positive amplitude excursion and produce pulse 79 of curve D for application to counter 26. Counter 26 assumes the third step of its cycle of eight as shown in curve E and causes the electron beam of tube 29 to step once more, to be incident on target anode 63. Element 33 is now the active code storing area and effects the application of a control potential on blocking oscillator 23 sufficient to operate it on a 1:1 basis.

Counter 23 therefore triggers in response to each of the next two line-drive pulses of curve A to supply pulses 80 and 81 to multivibrator 24. Pulse 81 causes multivibrator 24 and differentiator and rectifier 25 to produce pulse 82 of curve D at the output terminals of unit 25 for application to step counter 26 which, in turn, switches beam tube 29 again so that element 34 is now scanned or rendered active.

This process continues; after each complete cycle of operation of multivibrator 24, beam switch tube 29 steps along to scan the next member of the family of elements 31–38 and change the counting ratio of oscillator 23 which, in turn, varies the operating rate of multivibrator 24. After tube 29 has reached target element 68, the next pulse applied to the step counter restores it to its first operating step, as shown at the right hand portion of curve E, to once again position the electron beam to read target 61 and establish a counting ratio for counter 23 of 15:1.

The signal of curve C is supplied to coder 12 as a beam deflection-control signal. The amplitude excursions of this signal shift the beam of coder 12 back and forth and in view of the random nature of these occurrences, effective picture scrambling is realized.

If desired, additional circuitry may be employed to isolate the resistive elements from beam-deflection tube 29. For example, each of target anodes 61–68 may be connected to an input circuit of a respective one of a series of control tubes, such as triode amplifiers, and the anodes of the control tubes may be connected to respective ones of resistive elements 31–38 to provide load circuits therefor. The control tubes are actuated one at a time by the beam and the potential impressed on counter 23 may be derived from the cathode circuits of the tubes since the cathode current of each of such tubes is determined by the particular resistor in its load circuit.

As mentioned hereinbefore, it is desirable to employ reset pulses to establish all the counting mechanisms employed in the system to a predetermined reference operating condition or step from time to time. Reset signal source 72 produces such pulses for the counting circuits at the transmitter either at random or once per 60 fields as in the aforementioned Eilers et al. application. Source 72 also supplies signal bursts, corresponding to the reset pulses, to mixer 13 for transmission to the subscriber receivers. As will be seen later, a reset signal filter and rectifier circuit is provided at the receiver to filter out and rectify the signal bursts contained in the composite television signal to provide reset pulses for actuating corresponding counting circuits to the same reference operating conditions in synchronism, also as shown in the Eilers et al. application.

By way of summary, code card 30 constitutes a code storage device having a series of code storing areas (namely, printed circuit resistive elements 31–38) individually exhibiting, as to a property such as resistance which is common to all such areas, a particular value which is within a given range of values and which is determined in accordance with the stored information of each individual area. Of course, other properties which influence impedance may be employed, such as inductance, capacitance, etc. Beam-deflection tube 29, its associated deflection and target electrodes and actuating circuitry, constitute a reading device for reading the code storing areas or resistive elements to derive a control effect having a variable characteristic, such as amplitude, instantaneously determined by the value of the property (resistance) exhibited by such of the code storing areas as are instantaneously read by the reading device. Blocking oscillator counting device 23 and multivibrator 24 collectively comprise coding apparatus having a series of coding conditions (namely, the rate at which they impose operating mode changes on the transmitter) and responsive to variations in the amplitude characteristics of the control effect for changing from one to another of the coding conditions. Finally, the coupling circuit between cathode resistor 70 and counting device 23, which includes D.C. amplifier 71, constitutes means for utilizing the control effect derived by the reading device or beam-switch tube 29 to actuate the coding apparatus. Specifically, oscillator 23 and multivibrator 24 both change their operating rates in response to amplitude changes in the control signal from cathode resistor 70.

It will be seen that the decoding apparatus employed in the receiver is identical to the coding apparatus in the transmitter and thus for convenience the name "encoding apparatus" may be used to designate either one.

*Receiver construction*

Figure 3:
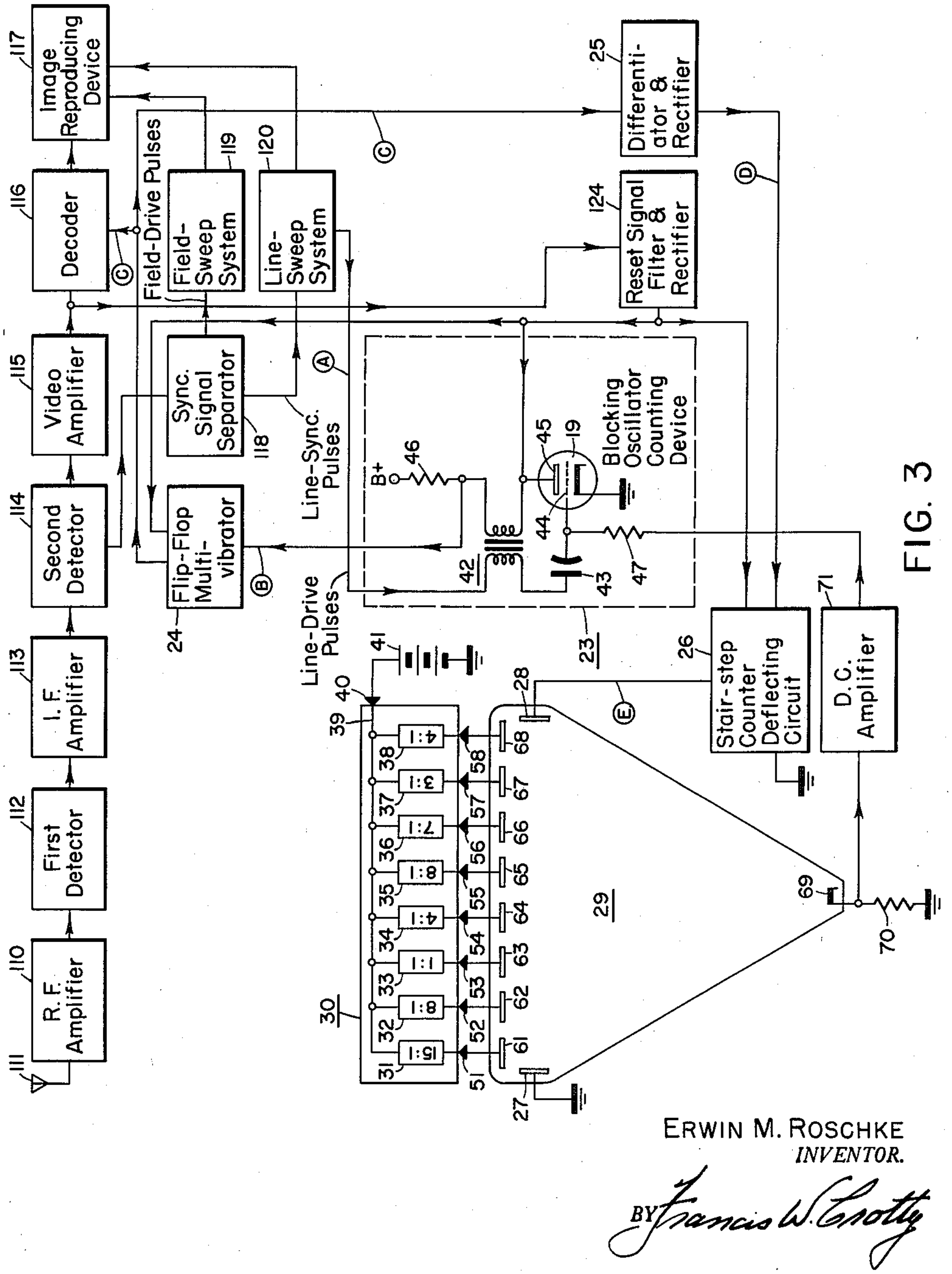

The receiver of Figure 3 which may utilize the subscription telecast from the transmitter of Figure 1 includes a radio-frequency amplifier 110 which has its input circuit connected to an antenna 111 and its output circuit connected to a first detector 112. The first detector is coupled through an intermediate-frequency amplifier 113 to a second detector 114 which, in turn, is connected to a video amplifier 115. The video amplifier is coupled through a decoding device 116 to the input terminals of a cathode-ray image-reproducing device 117. Decoder 116 may be constructed similar to coder 12 at the transmitter but is arranged to operate in a complementary fashion in order effectively to compensate for the variations in the time relation between the video and synchronizing components of the received television signal. Complementary operation of the decoder may be assured by merely reversing the target anode connections of the beam-deflection tube in decoder 116 compared with the anode connections employed in the coder at the transmitter.

Second detector 114 is also coupled to a synchronizing-signal separator 118 which has one output circuit connected to a field-sweep system 119 and another output circuit connected to a line-sweep system 120. These sweep systems are connected to suitable deflection elements associated with reproducing device 117. Line-drive pulses are derived from sweep system 120 and supplied to a blocking oscillator counting device 23 which is identical to the correspondingly numbered oscillator in the transmitter. As indicated by the use of identical reference numerals, the remaining circuitry of Figure 3, with the exception of a reset signal filter and rectifier circuit 124, is identical to the corresponding elements in the transmitter of Figure 1. Unit 124, which has its input terminals connected to the output circuit of video amplifier 115 and its output terminals connected to additional input circuits of multivibrator 24, blocking oscillator 23 and stair-step counter 26, is the counter part of reset signal source 72 and is provided to filter out the reset bursts from the received television signal to produce reset pulses for the receiver counting circuits.

*Receiver operation*

In the operation of the receiver, the coded television signal from the transmitter of Figure 1 is intercepted by antenna 111, amplified by radio-frequency amplifier 110 and heterodyned to the selected intermediate frequency of the receiver in first detector 112. The resulting intermediate-frequency signal is amplified in intermediate-frequency amplifier 113 and detected in second detector 114 to produce a composite video signal. This latter signal is amplified in video amplifier 115 and translated through decoder 116 to the input terminals of image-reproducing device 117 to control the intensity of the electron beam in conventional manner.

The synchronizing components are separated in separator 118, the field-synchronizing components being utilized to synchronize sweep system 119 and therefore the vertical scanning of image reproducer 117 and the line-synchronizing components being utilized to synchronize sweep system 120 and consequently the horizontal scansion of reproducing device 117. Of course, the sound modulated carrier wave received along with the video carrier is translated and reproduced in an appropriate audio system which has been omitted from the drawings for the purpose of simplicity.

Figure 2:
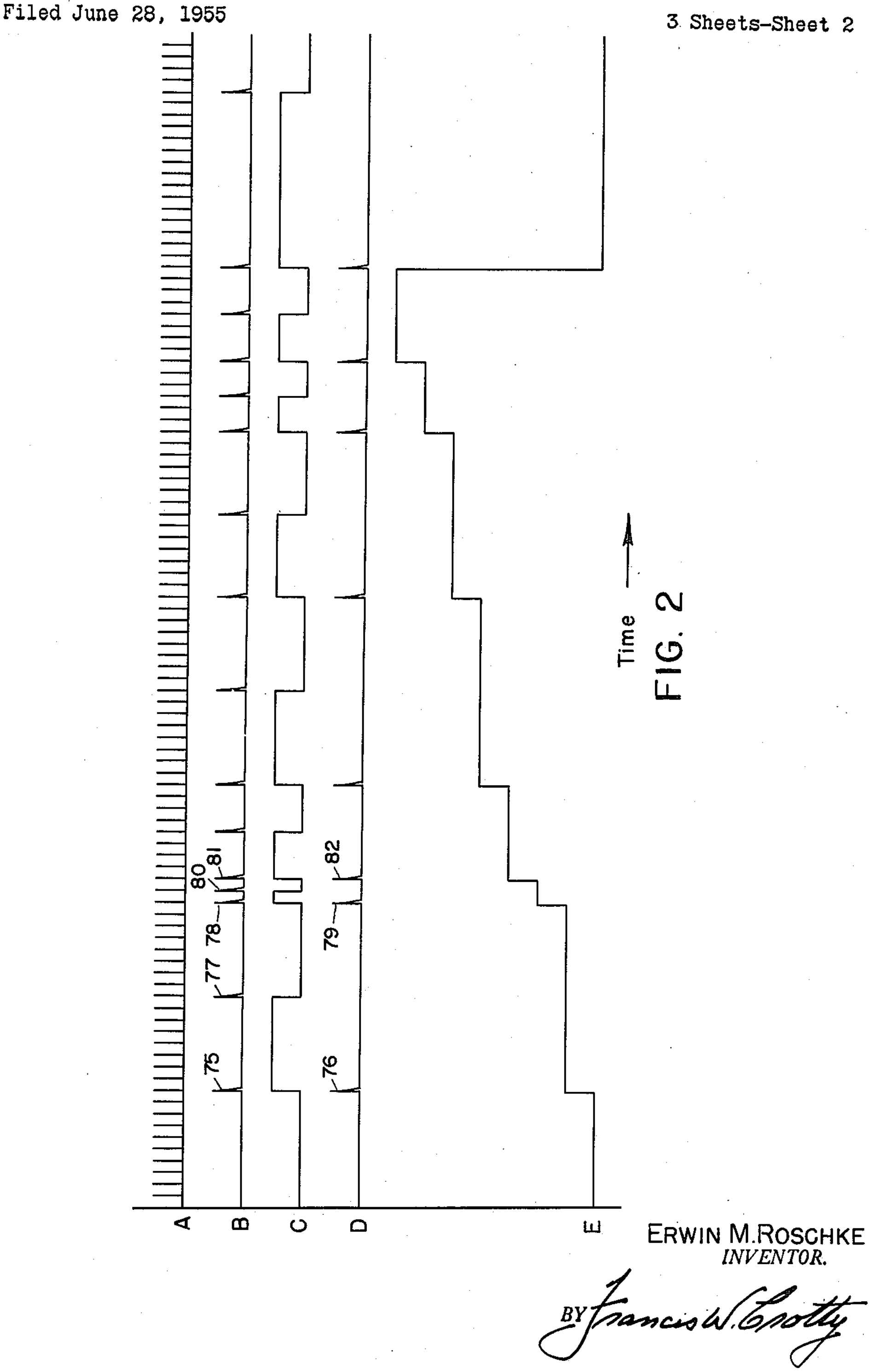
Figure 2 illustrates a series of wave forms useful in explaining the operation of the transmitter of Figure 1; and, Figure 3 is a schematic diagram of a subscription television receiver constructed in accordance with the invention for operation in conjunction with the transmitter of Figure 1.

Decoding at the receiver is accomplished in the identical manner explained hereinbefore in connection with the coding operation at the transmitter; accordingly, the wave forms of Figure 2 are illustrative of receiver as well as transmitter operation, and corresponding letter designations are assigned to the receiver diagram of Figure 3 where appropriate. Of course, code storage device or code card 30 employed at the receiver must be identical to the corresponding card at the transmitter. As mentioned hereinbefore, preferably a different code card having a different pattern of resistive elements is employed for each individual subscription program. A suitable charge may be assessed when each card is distributed to a subscriber receiver.

The invention provides, therefore, a subscription television system which employs a code storage device having a series of storing areas for developing a highly complex coding signal to achieve corresponding complex mode changing in the system.

While particular embodiments of the invention have been shown and described, modifications may be made, and it is intended in the appended claims to cover all such modifications as may fall within the true spirit and scope of the invention.

I claim:

1. An encoding arrangement for a subscription television system comprising: a code storage device having a series of code storing areas individually exhibiting, as to a property which is common to all such areas, a particular value which is within a given range of values and which is determined in accordance with the stored information of each individual area; a reading device for reading said code storing areas to derive a control effect having a variable characteristic instantaneously determined by the value of the aforesaid property exhibited by such of said code storing areas as are instantaneously read by such reading device; an encoding apparatus having a series of encoding conditions and responsive to variations in the aforesaid characteristic of said control effect for changing from one to another of the aforesaid encoding conditions; means for utilizing said control effect derived by said reading device to actuate said encoding apparatus; and feedback means coupled from said encoding apparatus for actuating said reading device.

2. An encoding arrangement for a subscription television system comprising: a code storage device having a series of code storing areas individually exhibiting a resistivity of a particular value which is within a given range of values and which is determined in accordance with the stored information of each individual area; a reading device for reading said code storing areas to derive a control effect having a variable intensity instantaneously determined by the resistivity value exhibited by such of said code storing areas as are instantaneously read by such reading device; an encoding apparatus having a series of encoding conditions and responsive to variations in the aforesaid intensity of said control effect for changing from one to another of the aforesaid encoding conditions; means for utilizing said control effect derived by said reading device to actuate said encoding apparatus; and feedback means coupled from said encoding apparatus for actuating said reading device.

3. An encoding arrangement for a subscription television system comprising: a code storage device having a series of code storing areas individually exhibiting, as to a property which is common to all such areas, a particular value which is within a given range of values and which is determined in accordance with the stored information of each individual area; a reading device for sequentially scanning said code storing areas to derive a control effect having a variable characteristic instantaneously determined by the value of the aforesaid property exhibited by such of said code storing areas as are instantaneously scanned by such reading device; an encoding apparatus having a series of encoding conditions and responsive to variations in the aforesaid characteristic of said control effect for changing from one to another of the aforesaid encoding conditions; means for utilizing said control effect derived by said reading device to actuate said encoding apparatus; and feedback means coupled from said encoding apparatus for actuating said reading device.

4. An encoding arrangement for a subscription television system comprising: a code storage device having a series of code storing areas individually exhibiting, as to a property which is common to all such areas, a particular value which is within a given range of values and which is determined in accordance with the stored information of each individual area; a reading device for sequentially scanning said code storing areas at a relatively slow rate to derive a control effect having a variable characteristic instantaneously determined by the value of the aforesaid property exhibited by such of said code storing areas as are instantaneously scanned by such reading device; an encoding apparatus having a series of encoding conditions and responsive to variations in the aforesaid characteristic of said control effect for changing from one to another of the aforesaid encoding conditions, each of said encoding conditions effecting mode changes in said subscription television system as between a plurality of possible operating modes at a recurrence rate which is relatively fast as compared to the scanning rate of said reading device; means for utilizing said control effect derived by said reading device to actuate said encoding apparatus; and feedback means coupled from said encoding apparatus for actuating said reading device.

5. An encoding arrangement for a subscription television system comprising: a code storage device having a series of code storing areas individually exhibiting, as to a property which is common to all such areas, a particular value which is within a given range of values and which is determined in accordance with the stored information of each individual area; a reading device, including scanning means, for scanning said code storing areas to derive a control effect having a variable characteristic instantaneously determined by the value of the aforesaid property exhibited by such of said code storing areas as are instantaneously scanned by such reading device; an encoding apparatus having a series of encoding conditions and responsive to variations in the aforesaid characteristic of said control effect for changing from one to another of the aforesaid encoding conditions; feedback means coupled from said encoding apparatus for controlling the scanning operation of said reading device to determine the instantaneous code storing areas scanned; and means for utilizing said control effect derived by said reading device to actuate said encoding apparatus.

6. An encoding arrangement for a subscription television system comprising: a code storage device having a series of code storing areas individually exhibiting, as to a property which is common to all such areas, a particular value which is within a given range of values and which is determined in accordance with the stored information of each individual area; a reading device for reading said code storing areas to derive a control effect having a variable characteristic instantaneously determined by the value of the aforesaid property exhibited by such of said code storing areas as are instantaneously read by such reading device; an encoding apparatus, including a counting device, having a series of encoding conditions in each of which said counting device exhibits a different counting ratio and responsive to variations in the aforesaid characteristic of said control effect for adjusting the counting ratio of said counting device to change from one to another of the aforesaid encoding conditions; means for utilizing said control effect derived by said reading device to actuate said encoding apparatus; and feedback means coupled from said encoding apparatus for actuating said reading device.

7. An encoding arrangement for a subscription television system comprising: a code storage device having a series of code storing areas individually exhibiting, as to a property which is common to all such areas, a particular value which is within a given range of values and which is determined in accordance with the stored information of each individual area; a reading device for reading said code storing areas to derive a control effect having a variable characteristic instantaneously determined by the value of the aforesaid property exhibited by such of said code storing areas as are instantaneously read by such reading device; an encoding apparatus, including a multi-step cyclic counting device, having a series of encoding conditions in each of which said counting device exhibits a different counting ratio and responsive to variations in the aforesaid characteristic of said control effect for adjusting the counting ratio of said counting device to change from one to another of the aforesaid encoding conditions; feedback means coupled from said encoding apparatus for effecting actuation of said reading device at the completion of each cycle of operating steps of said counting device to read a different one of said code storing areas; and means for utilizing said control effect derived by said reading device to actuate said encoding apparatus.

8. An encoding arrangement for a subscription television system comprising: a code storage device having a series of code storing areas individually exhibiting, as to a property which is common to all such areas, a particular value which is within a given range of values and which is determined in accordance with the stored information of each individual area; a reading device for reading said code storing areas to derive a control effect having a variable characteristic instantaneously determined by the value of the aforesaid property exhibited by such of said code storing areas as are instantaneously read by such reading device; an encoding apparatus having a series of encoding conditions in each of which mode changes are effected in said television system as between a plurality of possible modes at a different mode changing rate and responsive to variations in the aforesaid characteristic of said control effect for changing from one to another of the aforesaid encoding conditions; means for utilizing said control effect derived by said reading device to actuate said encoding apparatus to effect mode changes in said television system at one rate during some intervals and another rate during other intervals; and feedback means coupled from said encoding apparatus for actuating said reading device.

9. An encoding arrangement for a subscription television system comprising: a code storage device having a series of code storing areas individually exhibiting, as to a property which is common to all such areas, a particular value which is within a given range of values and which is determined in accordance with the stored information of each individual area; a reading device for reading said code storing areas to derive a control effect having a variable characteristic instantaneously determined by the value of the aforesaid property exhibited by such of said code storing areas as are instantaneously read by such reading device; an encoding apparatus, including a multi-step cyclic counting device, having a series of encoding conditions in each of which said counting device exhibits a different counting ratio and responsive to variations in the aforesaid characteristic of said control effect for adjusting the counting ratio of said counting device to change from one to another of the aforesaid encoding conditions; feedback means from said encoding apparatus for effecting actuation of said reading device at the completion of each cycle of operating steps of said counting device to read a different one of said code storing areas; means for utilizing said control effect derived by said reading device to actuate said encoding apparatus; and means for resetting from time to time said counting device to a predetermined reference operating step and said reading device to a predetermined reading position.

10. An encoding arrangement for a subscription television system comprising: a replaceable printed-circuit code card having a series of resistive elements printed thereon individually exhibiting a resistivity value which is within a given range of values; a beam-deflection device having a cathode, means for developing an electron beam, a pair of deflection elements and a series of target anodes individually coupled to an assigned one of said resistive elements; means for applying a deflection signal to said deflection elements for scanning said target anodes to develop a control signal at said cathode having an instantaneous amplitude determined by the particular resistive element instantaneously scanned; an encoding apparatus, including a multi-step cyclic counting device, having a series of encoding conditions in each of which said counting device exhibits a different counting ratio and responsive to amplitude variations of said control signal for adjusting the counting ratio of said counting device to change from one to another of the aforesaid encoding conditions; means for utilizing said control signal developed at said cathode to actuate said encoding apparatus; and feedback means coupled from said encoding apparatus and to said deflection-signal-applying means for controlling the scanning operation of said beam-deflection device.

11. A subscription television transmitter comprising: a code storage device having a series of code storing areas individually exhibiting, as to a property which is common to all such areas, a particular value which is within a given range of values and which is determined in accordance with the stored information of each individual area; a reading device for reading said code storing areas to derive a control effect having a variable characteristic instantaneously determined by the value of the aforesaid property exhibited by such of said code storing areas as are instantaneously read by such reading device; a coding apparatus having a series of coding conditions and responsive to variations in the aforesaid characteristic of said control effect for changing from one to another of the aforesaid coding conditions; means for utilizing said control effect derived by said reading device to actuate said coding apparatus; and feedback means coupled from said encoding apparatus for actuating said reading device.

12. A subscription television receiver comprising: a code storage device having a series of code storing areas individually exhibiting, as to a property which is common to all such areas, a particular value which is within a given range of values and which is determined in accordance with the stored information of each individual area; a reading device for reading said code storing areas to derive a control effect having a variable characteristic instantaneously determined by the value of the aforesaid property exhibited by such of said code storing areas as are instantaneously read by such reading device; a decoding apparatus having a series of decoding conditions and responsive to variations in the aforesaid characteristic of said control effect for changing from one to another of the aforesaid decoding conditions; means for utilizing said control effect derived by said reading device to actuate said decoding apparatus; and feedback means coupled from said encoding apparatus for actuating said reading device.

References Cited in the file of this patent

UNITED STATES PATENTS

| | | |
|---|---|---|
| 2,224,646 | Friedman | Dec. 10, 1940 |
| 2,320,150 | Loughridge | May 25, 1943 |
| 2,402,058 | Loughren | June 11, 1946 |
| 2,414,472 | Loughridge | Jan. 21, 1947 |
| 2,472,774 | Mayle | June 7, 1949 |
| 2,517,712 | Riggen | Aug. 8, 1950 |
| 2,568,449 | Hansen | Sept. 18, 1951 |
| 2,599,949 | Skellett | June 10, 1952 |
| 2,667,633 | Mandel | Jan. 26, 1954 |
| 2,701,346 | Powell | Feb. 1, 1955 |
| 2,772,390 | Woodruff | Nov. 27, 1956 |
| 2,817,824 | Albright | Dec. 24, 1957 |
| 2,862,049 | Bridges | Nov. 25, 1958 |

OTHER REFERENCES

Hershler, A. and Seidman, A. H.: "General Purpose Short-Pulse Generator," Electronics, vol. 26, No. 8, August 1953, pp. 182–183.